United States Patent Office 2,940,069
Patented June 7, 1960

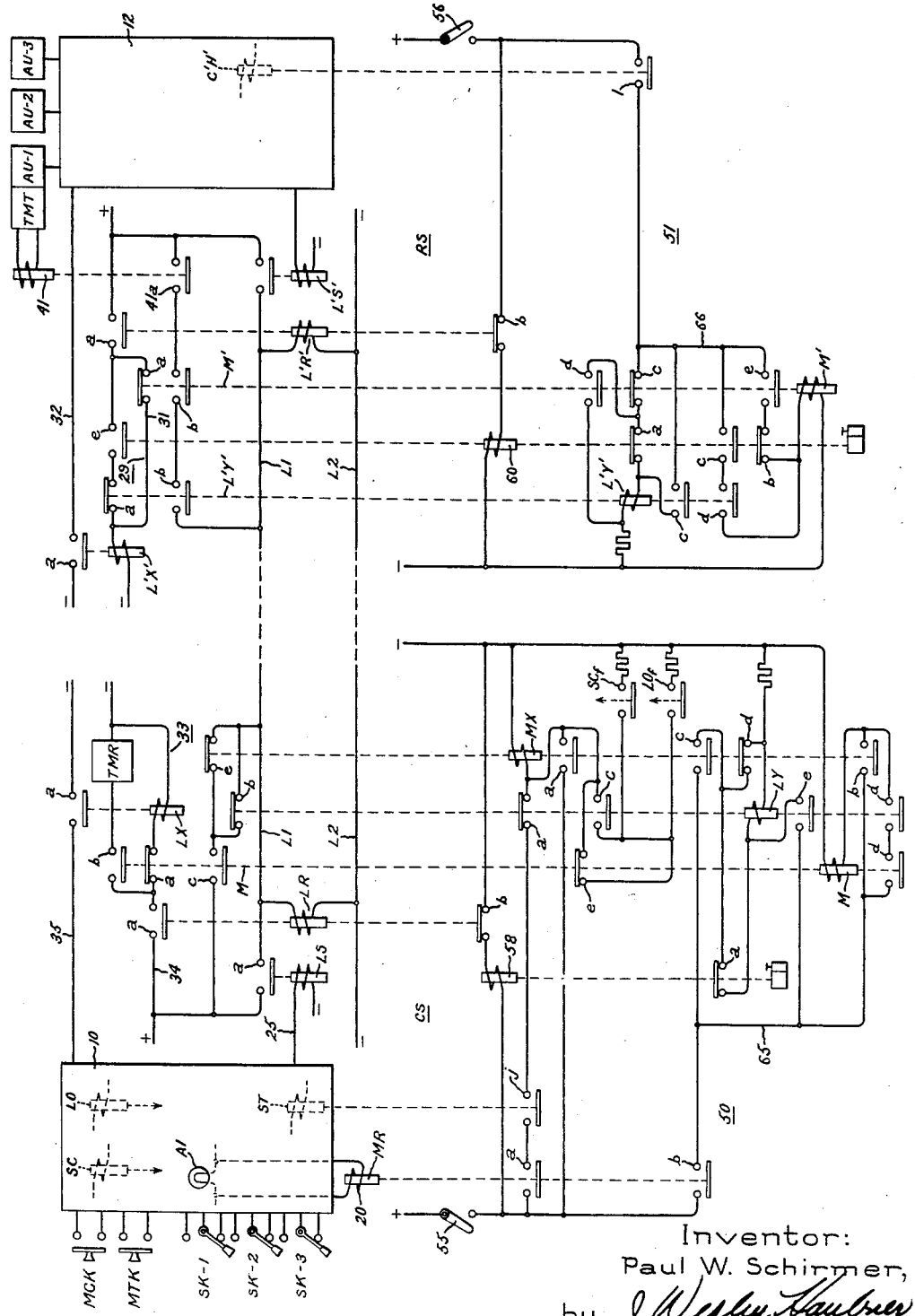

2,940,069

COMBINED SUPERVISORY CONTROL AND TELEMETERING SYSTEM

Paul W. Schirmer, Millbourne, Pa., assignor to General Electric Company, a corporation of New York Filed Nov. 15, 1954, Ser. No. 468,630

5 Claims. (Cl. 340—180)

This invention relates to a combined supervisory control and telemetering system and, more particularly, a combined system wherein both supervisory codes and telemetering signals are transmitted over a single channel.

A type of control system which is widely used to enable a dispatcher in his office to select and control any one of a plurality of apparatus units at a remote station is the single-channel, impulse code type of supervisory control system. As exemplified in Purcell Patent No. 2,492,766, assigned to the assignee of the present invention, this type of system typically comprises a single channel interconnecting supervisory equipment located at both the dispatcher's office (hereinafter designated the control station) and at the remote station. Selection and control of a desired apparatus unit is achieved by transmitting over the channel codes of electrical impulses individual to the desired unit.

Frequently, it is desirable to obtain at the control station an indication of some particular quantity or condition associated with the supervised apparatus. A most economical manner of obtaining such a remote indication is to employ telemetering equipment which operates by conveying information to the control station over the same channel as the supervisory codes are transmitted. Frequently, it is desirable to transmit this telemetering information in the form of impulses occurring within a range of frequencies having the same general order of magnitude as the frequencies of the supervisory codes. This presents the problem that the telemetering signals, which are conveyed over the common channel, will be impressed upon the supervisory equipment and will operate devices within the supervisory equipment, as a result of which the supervisory equipment will lose its control over the telemetering operation. This control having been lost, the dispatcher would be unable to terminate the telemetering signals and to resume supervisory operations.

Thus, a primary object of my invention is to provide a combined supervisory control and telemetering system which, though employing only a single channel, is capable of utilizing impulse signals of the same general character for effecting both supervisory and telemetering operations.

A further object of my invention is to provide a combined supervisory control and telemetering system which requires no special filters or separate channels to permit a rapid transfer from telemetering to supervisory control, or vice versa.

In accordance with one form of my invention, transfer between supervisory and telemetering control is achieved by providing in both the control station and the remote station switching means which in a first set of positions is operable to effectively disconnnect the telemetering equipment from the channel and to connect the supervisory equipment thereto and in a second set of positions is operable to effectively connect the telemetering equipment to channel and to disconnect the supervisory equipment therefrom. For operating the switching means from said first to said second set of positions, I provide control means which, in response to completion of a selection operation, operates said switching means into said second set of positions, thus removing the supervisory equipment from the channel and transferring the telemetering equipment thereto whereby to initiate a telemetering operation. The control means is responsive to an electric impulse relatively long with respect to the supervisory and telemetering impulses to cause the switching means to restore the supervisory equipment to the channel and to disconnect the telemetering equipment therefrom. This relatively long impulse is provided by relay means selectively-operable from the control station.

For a better understanding of my invention reference may be had to the accompanying sheet of drawing wherein the single figure is a diagrammatic illustration of a combined supervisory control and telemetering system embodying my invention.

The preferred embodiment of the invention is shown and described herein as it is applied to the type of supervisory system disclosed in detail in the aforesaid Purcell Patent No. 2,492,766. To simplify the present disclosure, only those parts of the Purcell system which are deemed necessary to an understanding of my invention will be described and shown in the present application. To further facilitate an understanding of my invention, the devices which are common to the Purcell system and to the disclosed system will be designated by the same reference characters. It is to be understood that these common devices are electrically connnected in the supervisory equipment in the same manner in both this application and in the Purcell patent.

In the accompanying drawing I have designated the supervisory equipment at the control station CS by a block 10 and the supervisory equipment at the remote station RS by a block 12. These two stations are interconnected by any suitable signalling channel, such as a channel formed by a pair of line conductors L1 and L2 corresponding to the line conductors L1 and L2 of the Purcell patent. At the remote station RS, I have shown three apparatus units AU-1, AU-2, and AU-3, individual ones of which it is desired to select and control from the control station CS. These apparatus units are assigned three separate selection points and correspond to similarly designated units in the Purcell patent. For simplicity, only three such units have been shown as contrasted to the five shown in Purcell. At the control station there are shown three two-position select keys SK-1, SK-2, and SK-3, each of which is movable into a predetermined position to select a corresponding apparatus unit AU-1, AU-2, or AU-3, for control or indication. For example, as described in detail in the Purcell patent, if the select key SK-1 is lifted into its select position while the supervisory equipment is in its normal-at-rest position, a selection code of impulses individual to select key SK-1 and apparatus unit AU-1 is transmitted over the channel L1, L2 to the remote station. If this selection code correctly operates the supervisory equipment, it will render apparatus unit AU-1 controllable from the control station. Similarly, the operation of select key SK-2 when the system is in its normal-at-rest position will render apparatus unit AU-2 controllable from the control station. Similarly, apparatus unit AU-3 is selected by the operation of select key SK-3 in a corresponding manner. The supervisory equipment determines the correctness of the selection operation by automatically comparing the selection code with a check code transmitted from the remote station to the control station in response to selection of the predetermined apparatus unit. If these two codes correspond, an amber lamp located at the control station and individual to the apparatus unit selected will be automatically energized and lighted. Thus, in the first selection operation referred to above, lighting of the amber lamp A1 indicates that the corresponding apparatus unit AU–1 has been correctly selected. Individual amber lamps (not shown) associated with each of the other select keys at the control station similarly indicate whether operation of these keys has properly selected the corresponding apparatus unit.

To simplify the drawing and thereby facilitate an understanding of my invention, this amber lamp A1, which is located in the supervisory equipment 10 at the control station, has been shown without its interconnections to the various other components of the supervisory equipment. It is to be understood, however, that this lamp is connected in the supervisory equipment in the same manner as the lamp A1 of Purcell. As a part of the present invention, I have provided an additional relay MR having a coil 20 connected across amber lamp A1 so that this coil is energized and the relay MR is operated whenever the amber lamp is lighted. The function of this relay MR will soon appear more clearly, it being sufficient for the present merely to understand that the operation of relay MR is responsive to the successful completion of a selection operation.

Another relay ST having a coil which is shown unconnected within the supervisory equipment 10 corresponds to the coil of start relay ST in the Purcell patent. As pointed out in the Purcell patent, this relay ST is connected in such a manner that its coil will be energized in response to actuation of any select key into a select position and will remain energized until the selected apparatus unit is released. I provide this relay ST with additional contacts j which function in a manner soon to be described.

As described in the Purcell patent, successful selection of any one of the apparatus units also results in energization of a code check relay C'H', located in the supervisory equipment 12 at the remote station. A relay corresponding to this code check relay has been shown in my remote station supervisory equipment 12 and has been assigned a corresponding designation C'H'. Although not illustrated, it is to be understood that my relay C'H' is connected in the supervisory equipment in the same manner as Purcell's relay C'H'. I have simply added a normally-open set of contacts to the relay and designated these contacts 1, as may be seen in the drawing.

Once a desired apparatus unit has been correctly selected, the dispatcher may operate it in a predetermined desired manner by actuating suitable master control keys, such as MTK or MCK located in the supervisory equipment 10 at the control station. As disclosed in the Purcell patent, if the apparatus units are circuit breakers, MTK is a master trip key which upon actuation trips the selected breaker, whereas MCK is a master close key which upon actuation closes the selected breaker. After the dispatcher has performed whatever indicating or apparatus controlling operations are desired, he may release the selected apparatus unit from his control by returning the select key to its lower or reset position.

As disclosed in Purcell, actuating either of the control keys MTK or MCK when an apparatus unit has been selected will operate a sending-control relay SC. I provide this relay SC with an added set of contacts SCf which is utilized in a manner soon to be described. Similarly, as disclosed in Purcell, returning any one of the select keys SK–1, SK–2, or SK–3 to reset position will operate a relay LO. I have provided this relay LO with an added set of contacts LOf the purpose of which will soon appear more clearly. Although the detailed connections are not shown, the coil of relay LO and the coil of relay SC is each electrically connected in the supervisory equipment 10 in the same manner as described in Purcell, supra. To further simplify the drawings, I have not shown the usual mechanical connection between the contacts of relay SC and its coil-operated armature and the connection between the contacts of relay LO and its coil-operated armature.

To more clearly illustrate the manner in which codes, such as the above-mentioned selection codes and check codes, are transmitted between the supervisory equipment located in the control station and that located at the remote station, I have shown in the drawing impulse sender relays LS and L'S', impulse receiver relays LR and L'R', and auxiliary impulse receiver relays LX and L'X', all of which correspond to identically designated relays in the Purcell patent. Pairs of relays denoted by corresponding reference characters perform corresponding functions at the different stations, the primes being used to distinguish the remote station relays from the control station relays. Each of the relays LS and L'S' of the present application has been shown with only one set of contacts in contrast to the two shown in Purcell. This omission is intended merely to simplify my disclosure by eliminating parts which serve identical functions.

As described more fully in Purcell, when a selection key at the control station is actuated, the supervisory equipment 10 conveys to the impulse sender relay LS over the conductor 25 a predetermined code of spaced current impulses. The sender relay LS picks up in response to the presence of an impulse and drops out in response to the absence thereof, with the result that its contacts a are repetitively opened and closed in accordance with the code conveyed to the coil of LS. In closing, the contacts a of sender relay LS complete a circuit across a suitable direct current source, such as a line supply battery, (not shown) and, in opening, they interrupt this circuit. Since this circuit includes the line conductor L1, L2, it will be apparent that the operation of relay LS impresses upon the channel L1, L2, a code duplicating the code which is conveyed to the coil of sender relay LS. Since the coil of the receiver relay L'R' at the remote station is connected across L1, L2, the relay L'R' at the remote station will be energized in accordance with the transmitted code. Assuming the system to be in the position shown in the drawing, this opening and closing of contacts a of L'R' will correspondingly complete and interrupt an energizing circuit 29 for auxiliary receiver relay L'X'. This energizing circuit 29 extends from plus through the contacts a of L'R', the contacts a of relay M', conductor 31, and through the coil of L'X' to minus. The auxiliary relay L'X' responds by repetitively opening and closing its contacts a to transmit the code over an input circuit 32 to the remote station supervisory equipment 12.

In a corresponding manner check codes are transmitted from the remote station to the control station by the impulse sender relay L'S' which keys the channel L1, L2 to energize the receiver relay LR at the control station in accordance with the check code. This relay LR responds by opening and closing an energizing circuit 33 for LX in accordance with the code. This energizing circuit 33 extends from plus, through conductor 34, the contacts a of LR, the contacts a of M, the coil of auxiliary receiver relay LX to minus. The auxiliary relay LX responds by repetitively opening and closing its contacts a to transmit the code over an input circuit 35 to the supervisory equipment 10 at the control station.

Frequently, it is desirable to obtain at the control station an indication of some quantity condition prevailing at the remote station. This information may be transmitted to the control station by means of telemeter transmitter equipment arranged at the remote-station in suitable quantity-measure relationship. If desired, the supervisory equipment may be provided with an additional and separate selection point for this telemeter transmitter, but, preferably, the transmitter is assigned to the same selection point as one of the apparatus units. For example in the drawing, I have shown a telemeter transmitter TMT assigned to the same selection point as apparatus unit AU–1. Thus, the composite unit containing the telemeter transmitter TMT and the apparatus unit AU-1 may be selected by operation of the select key SK-1. Since this transmitter equipment may be of a suitable conventional type, it has been shown in schematic form only. Typically, this telemeter transmitter equipment measures the quantity in question and provides an electric signal having characteristics varying as a function of the measured quantity. Typically, this signal is supplied to a telemeter transmitting relay which responds by opening and closing its contacts in a manner to produce a telemetering signal having characteristics which are indicative of the measured quantity. In the drawing I have shown such a transmitter relay at 41. A most economical manner for conveying the telemetering signal to the control station is to transmit the signal over the same channel as the supervisory codes are transmitted. This, of course, obviates the need for more than one signalling channel. To so utilize the single channel L1, L2 shown in the drawing, I have provided the telemeter transmitting relay 41 with contacts 41a arranged in parallel circuit relationship with the contacts of the supervisory sending relays L'S'. If the contacts b of L'Y' and M', which are in series with contacts 41a, are closed when the telemeter transmitting relay 41 is transmitting telemetering signals, the telemetering relay will transmit signals over the channel in the same general manner as the supervisory sender relay L'S' transmitted supervisory codes.

At the control station, I have shown a telemeter receiver TMR which may be of any conventional form which is capable of converting the transmitted signal into an output quantity indicative of the measured quantity. If this telemeter receiver TMR is properly connected in circuit with the channel L1, L2, it will be apparent that telemetering signals transmitted over the channel will be impressed upon the receiver, and the receiver will respond by providing an indication of the measured quantity, as is desired.

If the telemetering signals are of a character which is capable of operating the devices within the supervisory equipment, e.g., if the telemetering and supervisory impulses fall within the same general range of frequencies, a serious problem arises from utilizing the same channel for supervisory and telemetering operations. Without the transfer means (soon to be described) of my invention, there is a problem that the telemetering impulses will be transmitted into the supervisory equipment and will operate the control devices contained therein. As a result, the supervisory equipment would lose its control over the selected unit and the dispatcher would be unable to terminate the telemetering signals and to resume supervisory operations.

To preclude the possibility of these undesirable results, I have provided a pair of transfer circuits 50 and 51, the transfer circuit 50 being located at the control station and the transfer circuit 51 at the remote station. These transfer circuits contain switching means comprising the relays M and M' which in one set of positions are operable to effectively connect the supervisory equipment to the channel and to effectively disconnect the telemetering equipment therefrom, and in another set of positions are operable to reverse these connections, i.e., to connect the telemetering equipment to the channel and to disconnect the supervisory equipment therefrom. In the position shown in the drawing, the switching relays M and M' are operable to effectively connect the supervisory equipment to the channel and to disconnect the telemetering equipment therefrom. More particularly, as shown in the drawing, the contacts a of relay M which are in series with the auxiliary receiver relay LX are closed thereby rendering the energizing circuit 33 for relay LX responsive to the closing and opening of contacts a of the impulse receiver relay LR. Thus, when relay M is in the position shown, the relay LX is capable of transmitting supervisory codes to the supervisory equipment 10 in response to the operation of receiver relay LR. As a result, the supervisory equipment 10, as shown, may be considered as connected to the channel. During this period, the contacts b of relay M, however, are open, and, accordingly, the energizing circuit for the telemeter receiver is inoperative. As a result, the telemeter receiver is effectively disconnected from the channel and will not receive the impulses produced by the contacts a of the receiver relay LR. In a corresponding manner, at the remote station, the supervisory equipment 12 is effectively connected to the channel and the telemeter equipment is disconnected therefrom. For example, with the contacts a of relay M' closed as shown, the energizing circuit 29 will respond to opening and closing of the contacts a of the impulse receiver relay L'R', with the result that L'X' will respond to transmit supervisory codes to supervisory equipment 12. With the contacts b of relay M' open as shown, the telemeter transmitter relay 41 will be ineffective to transmit signals to the channel L1, L2. As a result, the telemeter transmitter equipment, as shown, may be considered as effectively disconnected from the channel L1, L2.

The manner in which switching relays M and M' operate to transfer the telemetering equipment to the channel may be more clearly illustrated by a brief description of a typical sequence of operations. Assume first that the disconnect switch 55 and 56 for each of the transfer circuits 50 and 51 is closed with the result that a pair of timing relays 58 and 60 located in the respective transfer circuits 50 and 51 are energized and operated out of their deenergized positions shown. Each of these timing relays is of a conventional form and comprises suitable retarding means for preventing dropout until the expiration of a definite time after deenergization. Assume next that the supervisory equipment is in its normal-at-rest position shown in the drawing, and the dispatcher desires to obtain a telemeter reading from the telemeter transmitter equipment associated with apparatus unit AU-1. The dispatcher will then operate the select key SK-1 with the result that a code of impulses individual to the unit containing AU-1 will be transmitted over the channel L1, L2. As previously described, this selection operation will energize and pick up the start relay ST thereby closing the contacts j of ST. If the supervisory equipment has operated to provide a correct selection of the desired apparatus unit AU-1, an energizing circuit for the amber lamp A1 will be completed to light the lamp. Completion of this energizing circuit also energizes the coil 20 of relay MR, which is connected across the lamp, with the result that MR picks up to close its contacts a and b. Closing of the contacts a of MR completes an energizing circuit for an auxiliary switching relay MX. This latter energizing circuit extends from a positive terminal through the contacts a of MR, the contacts j of ST, the contacts a of LY, and the coil of MX to a negative terminal. Energization of MX closes the contacts a of MX to complete a seal-in circuit for MX and also closes the contacts b of MX to complete an energizing circuit for the coil of switching relay M. This latter energizing circuit extends from plus, through the contacts b of MR, conductor 65, the contacts b of MX, and the coil of relay M to minus. Relay M responds to completion of this energizing circuit by operating to open its contacts a and close its contacts b, thereby disconnecting the supervisory relay LX from the channel and connecting the telemetering receiver TMR to the channel. Operation of relay M also closes its contacts d to complete a seal-in circuit for the coil of M and also closes its contacts c which, in closing, are effective to initiate a continuous impulse which is transmitted over the channel L1, L2 to operate line receiver relays at both the control station and the remote station. More particularly, the contacts c of relay M, in closing, complete a circuit extending from the positive terminal through the c contacts of relay M, through the b contacts of LY, through L1, the coils of the receiver relays LR and L'R' at both ends of the channel and thence to minus. The receiver relay LR, in operating, opens its contacts *b* to interrupt the energizing circuit for timing relay 58, which causes timing relay 58 after a definite time delay to drop out and close its contacts *a*. Drop out of the timing relay 58 completes an energizing circuit for the relay LY which operates to open its contacts *b* and thereby terminate the continuous impulse. The timing relay 58 is adjusted in such a manner that the time interval required for drop out is substantially longer than any of the impulses forming the supervisory or telemetering codes. Since this relay controls the length of the aforesaid continuous impulse it will be apparent that this impulse is substantially longer than the telemetering or supervisory impulses. The above-mentioned energizing circuit for impulse-terminating relay LY extends from plus through the *b* contacts of MR, the *c* contacts of MX, the *a* contacts of 58, through the coil of LY to minus. The relay LY, in operating, also closes its contacts *e* to complete a seal-in circuit for LY.

Thus, in summary, it may be seen that a successful selection of the desired remote unit has caused the transfer circuit 50 at the control station to disconnect the supervisory equipment 10 from the channel, to connect the telemetering receiver thereto, and to transmit a long impulse over the channel.

Termination of the long impulse interrupts the energizing circuit for the receiver relay LR, causing it to drop out and effect energization of the timing relay 58 through its contacts *b*.

The above-described series of operations at the control station causes the following operations at the remote station: At the end of the successful selection, the coil of check relay C'H' in the supervisory equipment 12 will have been energized. The long impulse, as previously described, has operated the relay L'R' at the remote station thereby opening its contacts *b* to interrupt the energizing circuit for the coil of timing relay 60. This causes timing relay 60 to drop out and thereby close its contacts *a* and open its contacts *e*. Closing of the contacts *a* of the timing relay completes an energizing circuit for the coil of L'Y'. This energizing circuit extends from plus, through the 1 contacts of check relay C'H', through the *c* contacts of relay M', through the *a* contacts of timing relay 60, the coil of relay L'Y' to minus. Relay L'Y' responds by operating to open its contacts *a* and closing its contacts *b*, *c*, and *d*. Closing of the contacts *c* of L'Y' seals in L'Y'. Closing of the contacts *d* of L'Y' prepares an energizing circuit for the coil of relay M'. When the long impulse is complete, the receiver relay L'R' drops out to effect energization of timing relay 60 which responds by closing its contacts *c* and completing the previously-prepared energizing circuit for switching relay M'. Relay M' responds by operating to open its contacts *a* and close its contacts *b*. Opening of the contacts *a* of M' interrupts the energizing circuit for L'X' thereby effectively disconnecting the supervisory equipment from the channel. Closing of the contacts *b* of relay M' prepares a telemeter keying circuit for the contacts 41*a* of telemeter transmitter relay 41, thus effectively connecting the telemeter transmitter equipment to the channel. With the contacts *b* of M' and *b* of L'Y' closed, the telemeter transmitter relay 41 is effective to transmit telemetering signals over the channel L1, L2. Since, as described hereinabove, the telemeter receiver at the control station has been connected to the channel at the completion of the selection operation, the telemetering signals will be transmitted to the receiver and provide the dispatcher with the metering information desired. During the telemetering operation the supervisory equipment at both the remote station and the control station will have been isolated from the channel by the switching means including relays M and M', as a result of which the telemetering signals will be confined solely to the telemetering equipment and will not operate devices within the supervisory equipment, as is desired.

The repetitive telemetering impulses cause the receiver relays LR and L'R' to repetitively pick up and drop out. Each time one of these relays LR or L'R' drops out, its contacts *b* complete an energizing circuit for the time-delayed dropout relays 58 and 60. The telemetering impulses, which pick-up the receiver relays LR and L'R', are of insufficient length to permit dropout of the timing relays 58 and 60. As a result, the timing relays 58 and 60 will remain picked-up during transmission of telemetering signals.

After the dispatcher has completed the desired telemetering operation, he may remove the telemetering equipment from the channel in the following manner. If he desires to reset the supervisory equipment, i.e., to return it to its normal-at-rest position, he simply returns the select key SK-1 to its lower or reset position. Alternatively, if he desires to perform a control function with respect to apparatus unit AU-1, he may actuate either of the control keys MCK or MTK. In either of these cases, the operation of transfer circuits 50, 51 is substantially the same, the sole difference being in the relay which initiates the transfer operation. If the dispatcher returns the select key to reset position, the relay LO initiates the transfer, whereas if he actuates either MCK or MTK, the relay SC initiates the transfer. Operation of LO will close the contacts *f* of LO to complete a shunt circuit around the coil of relay MX. This shunt circuit extends from the positive side of the MX coil through the *c* contacts of LY and the *f* contacts of LO to minus. Alternatively, closing of the contacts of SC will complete a similar shunt circuit around the coil of MX. Completion of either of these shunt circuits drops out MX, which closes the *e* contacts of MX thereby connecting the plus terminal of the line supply battery to the line L1 through the *c* contacts of relay M and the *e* contacts of relay MX. This initiates another long impulse which picks up the line receiver relay LR at the control station for a sufficient length of time to permit timing relay 58 to drop out. Timing relay 58, in dropping out, closes its contacts *a* to complete a shunt circuit around the coil of relay LY, which circuit is effective to de-energize and drop out LY. This shunt circuit extends from the positive terminal, through the *b* contacts of MR, conductor 65, the *b* contacts of LY, the *a* contacts of 58, the *d* contacts of MX to minus. The relay LY, in dropping out, opens its contacts *d* and thereby interrupts the seal-in energizing circuit for the coil of switching relay M. As a result, relay M drops out. In dropping out, the relay M opens its contacts *b* and *c* and closes its contacts *a*. Opening of the contacts *b* of M disconnects the telemeter receiver from the channel. Opening of the contacts *c* terminates the long impulse, and closing of contacts *a* of relay M restores the control station supervisory equipment to the channel. Switching relay M is provided with an additional set of contacts *e* which, upon drop out of M, close to maintain the shunt circuit around the coil of MX, thus preventing MX from again effecting operation of switching relay M during this particular cycle of operations.

When the long impulse is received at the remote station, relay L'R' is energized to open its contacts *b* for a sufficient interval of time to permit timing relay 60 to drop out. In dropping out, timing relay 60 closes its contacts *a* to complete a shunt circuit around the coil of relay L'Y'. This shunt circuit extends from plus through the 1 contacts of C'H', the *c* contacts of L'Y', the *a* contacts of relay 60, the *d* contacts of switching relay M' to minus. Completion of this shunt circuit drops out L'Y' which, in dropping out, opens its contacts *b* to disconnect the contacts 41*a* of the telemeter transmitting relay from the channel and thereby terminate the keying of the channel by the telemeter transmitting relay. When the long impulse ends, L'R' is deenergized and drops out to close its contacts b which, in turn, causes the relay 60 to pick up. In picking up, relay 60 opens its contacts b thereby interrupting the energizing circuit for M'. This energizing circuit extended from plus, through C'H', conductor 66, the e contacts of M', the b contacts of 60, the coil of M' to minus. M' responds by dropping out to close its contacts a and opens its contacts b. Closing of the contacts a of relay M' restores the remote station supervisory equipment to the channel and opening of the contacts b maintains the telemeter transmitter disconnected from the channel.

When so restored to the channel, the supervisory equipment then becomes operable to effect a supervisory function corresponding to the key which had initiated restoration of the supervisory equipment. For example, if the master close key MCK had initiated the restoration, then when such restoration had been completed, the control station supervisory equipment 10 would transmit over the channel a closing control code which would cause the supervisory equipment 12 at the remote station to produce a closing action of the previously-selected apparatus unit or breaker AU-1. Similarly, if restoration of the supervisory equipment to the channel had been initiated by returning the select key SK-1 to its lower or reset position, then when such restoration had been completed, a reset code would be transmitted from the control station to the remote station to release the selected apparatus unit AU-1 from selected relationship and return the supervisory equipment to its normal-at-rest position. The manner in which these codes are generated and the manner in which they act to produce the desired operation of the supervisory equipment are described in detail in the aforementioned Purcell patent.

It will be apparent from the above that disconnection of the telemetering equipment from the channel and restoration of the supervisory equipment to the channel always occurs prior to actual release of the selected apparatus unit. It will also be apparent from the above-described breaker closing operation that the transfer circuits 50 and 51 are capable of restoring the supervisory equipment to the channel without releasing the selected apparatus unit, i.e., with the selected apparatus unit retained in selected relationship. Thus, these transfer circuits 50 and 51 are capable of operating independently of and prior to unit-releasing action of the supervisory equipment. This independence is an important feature of my system because it enables me to assign a telemeter transmitter, such as TMT, to the same selection point as one of the apparatus units, thus obviating the need for additional selection points and corresponding additional relays.

When a previously-mentioned control operation, such as that initiated by the operation of control key MCK, had been completed, the dispatcher would release the key MCK. This would deenergize the relay SC, as explained in the aforementioned Purcell patent, and the SC relay would respond by dropping-out its contacts f to restore the transfer circuit 50 to the condition it was in immediately following the initial selection of apparatus unit AU-1. That is, the shunt circuit around the coil of relay MX would be removed by drop-out of the f contacts of relay SC, and the relay MX would then be free to operate. The transfer circuit 50 would then produce a long impulse in the same manner as it did when the initial selection has been completed, and the system would respond by disconnecting the supervisory equipment from the channel and connecting the telemetering equipment to the channel in the same manner as previously-described.

Thus, in summary, it will be seen that upon the selection of the unit containing the telemeter transmitter and apparatus AU-1, the transfer means 50, 51 operates to isolate the supervisory equipment 10, 12 from the channel and to connect the telemetering equipment TMT 41, and TMR thereto. When so connected the telemetering equipment conveys information over the channel and provides the dispatcher with the desired telemetering information. When the dispatcher wishes to terminate this telemetering operation, he may either reset select key SK-1 or actuate one of the master control keys, such as MCK or MTK. Either of these operations by the dispatcher initiates a long impulse which causes the transfer means 50, 51 to operate to restore the supervisory equipment to the channel and to remove the telemetering equipment therefrom. This selection and removal of the telemetering equipment from the channel can be repeated as many times as the dispatcher desires simply by repeating the above series of operations.

While I have illustrated my invention as applied to a supervisory control system of the type utilizing a two-wire metallic channel, it is to be understood that my invention is equally applicable to control systems which utilize other types of channels, such as a carrier-current channel or a microwave channel. It will also be apparent to those skilled in this art that my invention, while described in connection with a supervisory control system of type disclosed in the Purcell patent, is equally applicable to other forms of supervisory equipment. Similarly, my invention is not limited to the type of telemetering equipment shown. For example, it applies equally well to the electronic types of telemeter transmitter which require no transmitting relay such as 41.

While I have shown and described a particular embodiment of my invention, it will be obvious to those skilled in the art that various other changes and modifications may be made without departing from my invention in its broader aspects and I, therefore, intend in the appended claims to cover all such changes and modifications as fall within the true spirit and scope of my invention.

What I claim as new and desire to secure by Letters Patent is:

1. In combination, a control station, a remote station, means providing a channel interconnecting said stations, a plurality of selectable units at said remote station, supervisory equipment at said control station for transmitting over said channel a code of spaced electrical impulses individual to each of said units, supervisory equipment at said remote station responsive to said codes for selecting a unit corresponding to the code transmitted, one of said units including telemeter transmitter equipment operable when connected to said channel to transmit thereover spaced telemetering impulses indicative of a measured quantity, telemeter receiver equipment at said control station for receiving and utilizing said telemetering impulses, first switching means at said control station operable to effectively disconnect said control station supervisory equipment from said channel and to connect said telemetering receiver thereto, means responsive to selection of said one unit for operating said first switching means, means for transmitting an impulse substantially longer than said supervisory or telemetering impulses over said channel in response to selection of said one unit, second switching means at said remote station operable to disconnect said remote station supervisory equipment to said channel, means responsive to completion of said long impulse for operating said second switching means whereby at the completion of said long impulse the supervisory equipment is effectively disconnected from said channel and the telemetering equipment is effectively connected thereto so as to effect a telemetering operation, means for terminating said telemetering operation, and restoring means operable upon termination of said telemetering operation for causing said first and second switching means to connect said supervisory equipments to said channel and to disconnect said telemetering equipments from said channel, said restoring means operating independently of and prior to unit-releasing action of said supervisory equipments so that said one unit is retained in selected relationship in readiness for a subsequent supervisory control operation.

2. In combination, a control station, a remote station, means providing a channel interconnecting said stations, a plurality of selectable units at said remote station, means including supervisory equipment at said control station for transmitting over said channel a code of electrical impulses individual to each of said units, supervisory equipment at said remote station responsive to said codes for selecting a unit corresponding to the code transmitted, said supervisory equipment being adapted to release the selected unit in response to still another code, one of said units including telemeter transmitter equipment operable to produce telemetering signals comprising electrical impulses indicative of a measured quantity, telemeter receiver equipment at said control station for receiving and utilizing said signals, first switching means at said control station operative in a first position to effectively disconnect said telemeter receiver from said channel and to effectively connect said control station supervisory equipment thereto and operative in a second position to reverse said connections, second switching means at said remote station operative in a first position to effectively disconnect said telemeter transmitter from said channel and to effectively connect said remote station supervisory equipment thereto and operative in a second position to reverse said connections, means responsive to selection of said one unit for operating said first switching means from its first to its second position, means for transmitting over said channel in response to selection of said one unit a first impulse substantially longer than said supervisory or telemetering impulses, and means responsive to completion of said first long impulse for producing operation of said second switching means from its first to its second position whereby to connect said telemeter transmitter equipment to said channel, means selectively-operable from said control station to terminate said telemetering operation and to effect transmission of a second long impulse over said channel, and means responsive to said second long impulse and operable independently of and prior to unit-releasing action of said supervisory equipment to return said first and said second switching means to their respective first positions whereby said supervisory equipment is restored to said channel with the selected unit retained in selected relationship.

3. In combination, a control station, a remote station, means providing a channel interconnecting said stations, a plurality of selectable units at said remote station, means including supervisory equipment at said control station for transmitting over said channel a code of electrical impulses individual to each of said units, supervisory equipment at said remote station responsive to said codes for selecting a unit corresponding to the code transmitted, the supervisory equipment being operable to release the selected unit in response to another code transmitted over said channel, one of said units including telemeter transmitter equipment operable to produce telemetering signals comprising electrical impulses indicative of a measured quantity, telemeter receiver equipment at said control station for receiving and utilizing said signals, first switching means at said control station operative in a first position to effectively disconnect said telemeter receiver from said channel and to effectively connect said control station supervisory equipment thereto and operative in a second position to reverse said connections, second switching means at said remote station operative in a first position to effectively disconnect said telemeter transmitter from said channel and to effectively connect said remote station supervisory equipment thereto and operative in a second position to reverse said connections, means responsive to selection of said one unit for operating said first and second switching means from their first into their respective second positions whereby to disconnect said supervisory equipment from said channel and to connect said telemetering equipment thereto, thus initiating a telemetering operation, means selectively-operable from said control station to terminate said telemetering operation and to transmit over said channel an impulse substantially longer than said telemetering and supervisory impulses, and means responsive to said long impulse and operable independently of and prior to unit-releasing action of said supervisory equipment to return said first and said second switching means to their respective first positions whereby said supervisory equipment is restored to said channel with the selected unit retained in selected relationship.

4. A control system comprising a control station, a remote station, means providing a channel interconnecting said station, a plurality of selectable units at said remote station, means including supervisory equipment at said control station for transmitting over said channel a supervisory code of spaced electrical impulses individual to each of said units, supervisory equipment at said remote station responsive to said codes for selecting a unit corresponding to the code transmitted, said supervisory equipment being adapted to release the selected unit in response to still another code, one of said units including telemeter transmitting equipment operable when connected to said channel to transmit thereover telemetering impulse signals indicative of a measured quantity, telemeter receiver equipment at said control station for receiving and utilizing said telemetering impulses, said telemetering impulse signals and said supervisory codes both comprising electrical impulses occurring within a predetermined range of frequencies to which said supervisory equipment is sensitive, switching means operative in a first set of positions to effectively disconnect said telemetering equipment from said channel and to effectively connect said supervisory equipment to said channel and operative in a second set of positions to reverse the connections of said telemetering and supervisory equipment to said channel, means responsive to the selection of said one unit for operating said switching means from said first to said second set of positions whereby to connect said telemetering equipment to said channel, thus initiating a telemetering operation, means selectively-operable from said control station to terminate said telemetering operation and to transmit over said channel an impulse substantially longer than said telemetering and supervisory impulses, and means responsive to said long impulse and operable independently of unit-releasing action of said supervisory equipment to return said switching means to said first set of positions whereby to restore said supervisory equipment to said channel with the selected unit retained in selected relationship and to disconnect said telemetering equipment therefrom.

5. The system of claim 1 in which said one selectable unit also includes apparatus controllable from said control station by means of impulse codes transmitted over said channel while said one selectable unit is retained in selected relationship, means operable while said one unit is retained in selected relationship for causing said first switching means to return said telemeter receiver equipment to said channel after said supervisory control operation and for causing an impulse long with respect to said telemetering and supervisory impulses to be transmitted over said channel, and means responsive to completion of said long impulse to cause said second switching means to return said telemeter transmitter equipment to said channel.

References Cited in the file of this patent

UNITED STATES PATENTS

| | | |
|---|---|---|
| 2,286,180 | Pickels | June 9, 1942 |
| 2,327,251 | Derr | Aug. 17, 1943 |
| 2,438,000 | Derr | Mar. 16, 1948 |
| 2,550,109 | Derr | Apr. 24, 1951 |
| 2,597,075 | Derr | May 20, 1952 |
| 2,644,931 | Derr | July 7, 1953 |